United States Patent [19]

Busch

[11] 3,762,520
[45] Oct. 2, 1973

[54] FLUID OPERATED FRICTION CLUTCH WITH DUMP VALVE

[75] Inventor: John M. Busch, San Jose, Calif.

[73] Assignee: FMC Corporation, San Jose, Calif.

[22] Filed: Aug. 13, 1971

[21] Appl. No.: 171,677

[52] U.S. Cl. ............. 192/106 F, 192/87.11, 137/56
[51] Int. Cl. ............................................ F16d 25/10
[58] Field of Search .................... 192/106 F, 85 AA, 192/87.11, 104 F, 105 F, 103 FA, 87.12

[56] References Cited
UNITED STATES PATENTS

| 3,576,241 | 4/1971  | Maurice ....................... | 192/106 F |
| 3,537,557 | 11/1970 | Olson ........................... | 192/106 F |
| 3,534,840 | 10/1970 | Snoy ............................. | 192/106 F |
| 2,916,122 | 12/1959 | Hindmarch ................... | 192/106 F |
| 3,470,988 | 10/1969 | Sieverkropp ................. | 192/106 F |
| 3,472,350 | 10/1969 | Overson ....................... | 192/106 F |

Primary Examiner—Benjamin W. Wyche
Attorney—F. W. Anderson et al.

[57] ABSTRACT

A clutch having a pair of rotatable assemblies with interleaved friction discs is engageable by a piston operating in response to fluid pressure within a cylinder. Upon disengagement of the clutch, a portion of the piston divides a pressure chamber within the cylinder into an inner cavity wherein fluid is retained and an outer cavity from which fluid is discharged. Resilient means, having a strength greater than the force developed by fluid retained within the inner cavity when subjected to maximum centrifugal force, holds the piston in place to prevent the bleeding of fluid from the inner cavity to the outer cavity until fluid in the inner cavity is subjected to pressure for engaging the clutch. A dump valve controls the discharge of fluid from the outer cavity in response to fluid pressure therein, and a retainer locks the piston against differential rotation relative to the cylinder.

3 Claims, 4 Drawing Figures

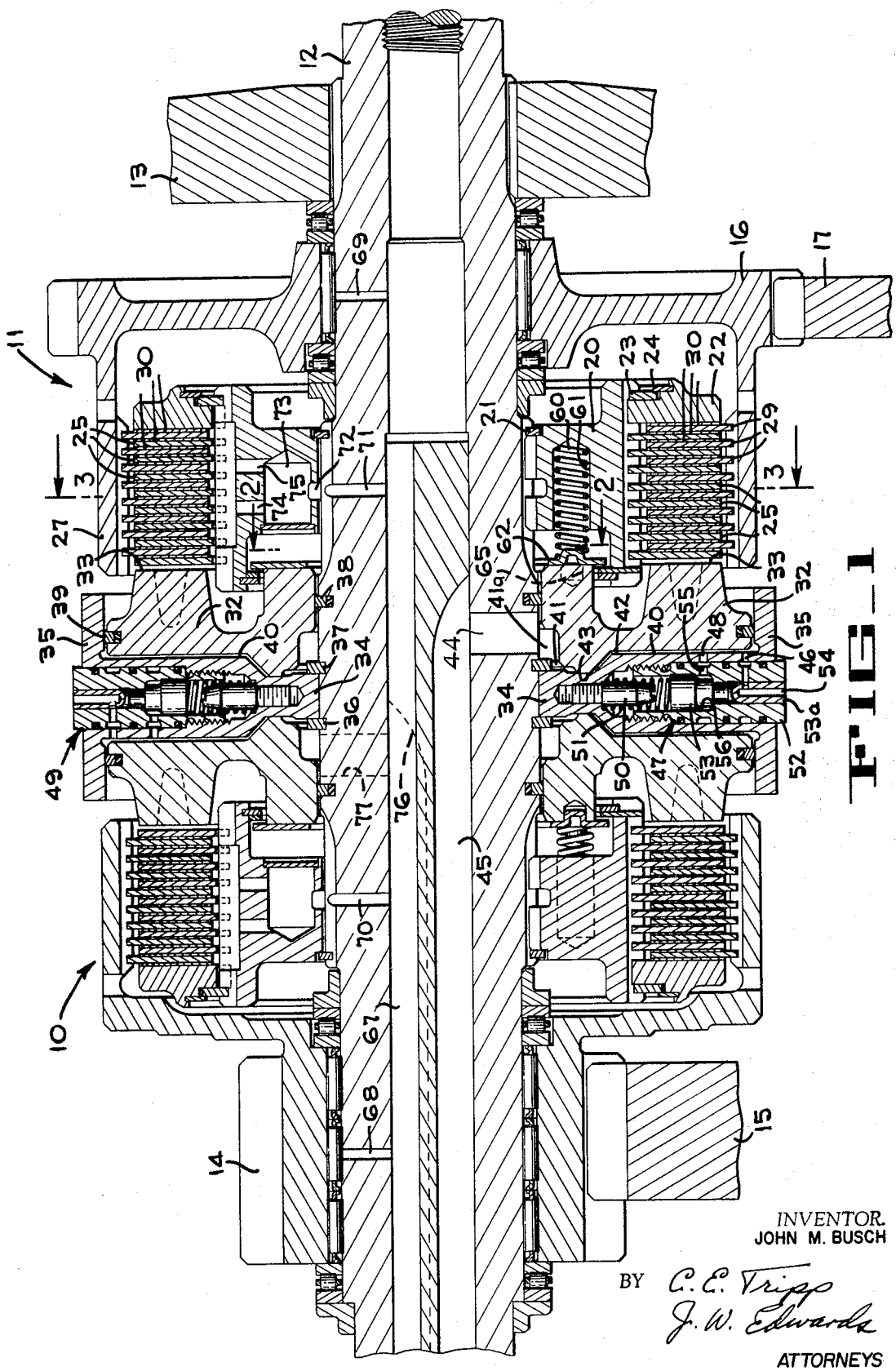
FIG_1

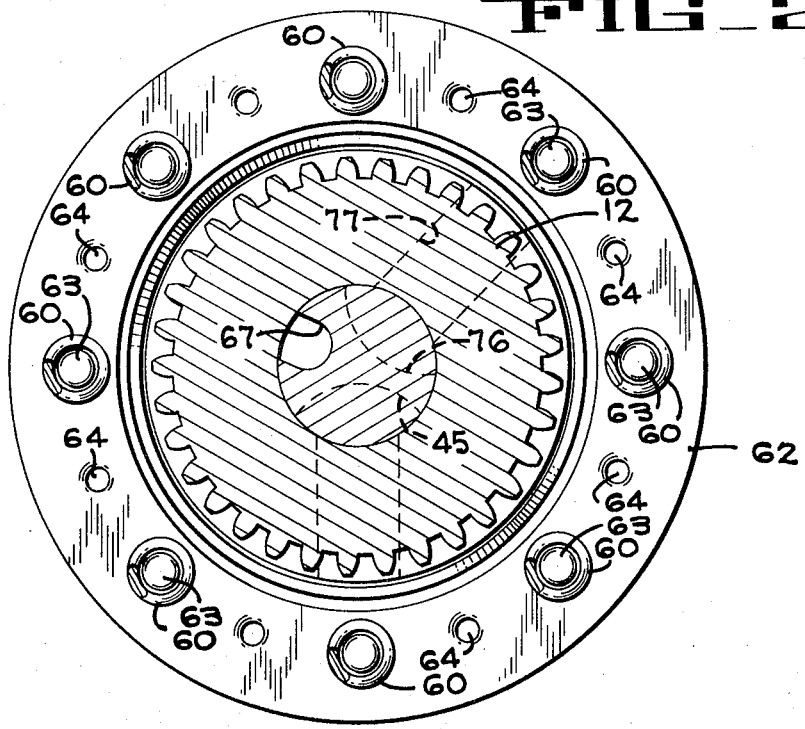
FIG_2
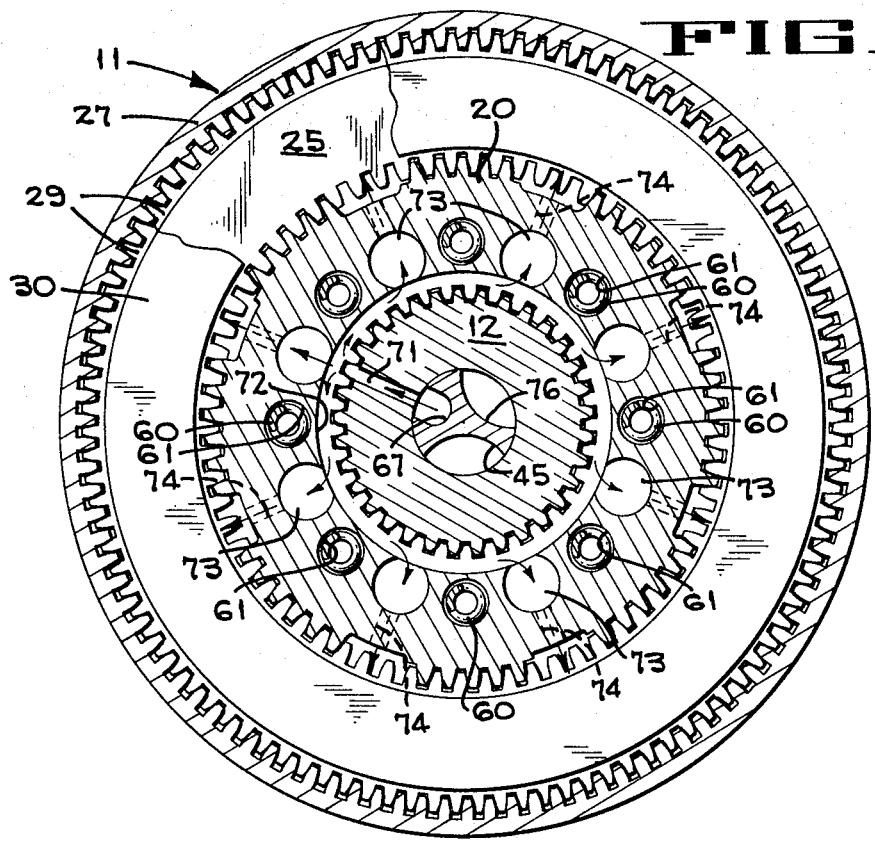
FIG_3

FLUID OPERATED FRICTION CLUTCH WITH DUMP VALVE

BACKGROUND OF THE INVENTION

1. Field of the Invention

This invention relates to friction clutch control by fluid pressure operators, and more particularly, to a fluid pressure operator adapted for rapid clutch engagement without danger of accidental actuation due to a pressure build-up in the residual fluid which is subjected to centrifugal force.

2. Description of the Prior Art

In a fluid operated friction clutch having residual fluid remaining in a rotating pressure chamber, centrifugal forces can cause a pressure build-up resulting in a partial engagement of the clutch. Such a partial engagement can cause wear or damage to the clutch elements or even an accidental actuation of the elements cooperating with the clutch. Consequently, it is desirable to vent residual fluid from the pressure chamber; however, such venting must not act so as to prevent the rapid engagement of the clutch when desired.

U.S. Pat. No. 2,795,309 discloses a fluid operated clutch with a pressure chamber vented by a pressure relief valve when the pressure therein falls between upper and lower limits. A piston divides the pressure chamber into an inner cavity and an outer cavity when the clutch is disengaged and residual fluid is sealed within the inner cavity. As pressure builds up due to centrifugal force, the piston is forced backward allowing fluid to flow to the outer cavity from which it can be vented. Thus, fluid can gradually bleed through the pressure chamber until the entire passage from which clutch pressure is applied is empty, and this passage must be refilled with fluid before the clutch can be engaged.

U.S. Pat. No. 2,841,023 discloses, in FIG. 3 thereof, a clutch which includes a valve radially slidable for venting residual fluid from a pressure chamber. Centrifugal force and spring biasing urge the valve towards a venting position and fluid is bled from the entire pressure chamber. Before engaging the clutch, the valve must be closed by applying fluid pressure thereto overcoming the centrifugal force and spring biasing so that fluid can be fed to the pressure chamber to cause the engagement of the clutch.

SUMMARY OF THE INVENTION

This invention provides for venting residual fluid from a portion of a rotatable pressure chamber to prevent accidental actuation of a clutch due to a pressure build-up in the fluid under the centrifugal forces acting thereon. Residual fluid retained in the remaining unvented portion of the pressure chamber can be subjected to pressure for rapid engagement of the clutch.

A friction clutch having a pair of rotatable assemblies with interleaved friction discs is engaged by a piston operating in a rotatable cylinder. A variable volume pressure chamber defined by the piston and cylinder is divided into an inner cavity and an outer cavity by a portion of the piston which contacts the cylinder when the clutch is disengaged. Means are provided for venting fluid from the outer cavity to prevent a build-up of pressure in the fluid by centrifugal force acting thereon, and the piston is resiliently held in place to seal fluid within the inner cavity by means having a strength greater than the force developed by the fluid retained in the inner cavity when subjected to maximum centrifugal force. The piston is locked against differential rotation relative to the cylinder to prevent undue wear.

BRIEF DESCRIPTION OF THE DRAWINGS

FIG. 1 is a longitudinal section through a pair of fluid operated friction clutches embodying the present invention.

FIG. 2 is an enlarged section taken on the line 2—2 of FIG. 1.

FIG. 3 is a section taken on the line 3—3 of FIG. 1.

DESCRIPTION OF THE PREFERRED EMBODIMENT

Figure 4:
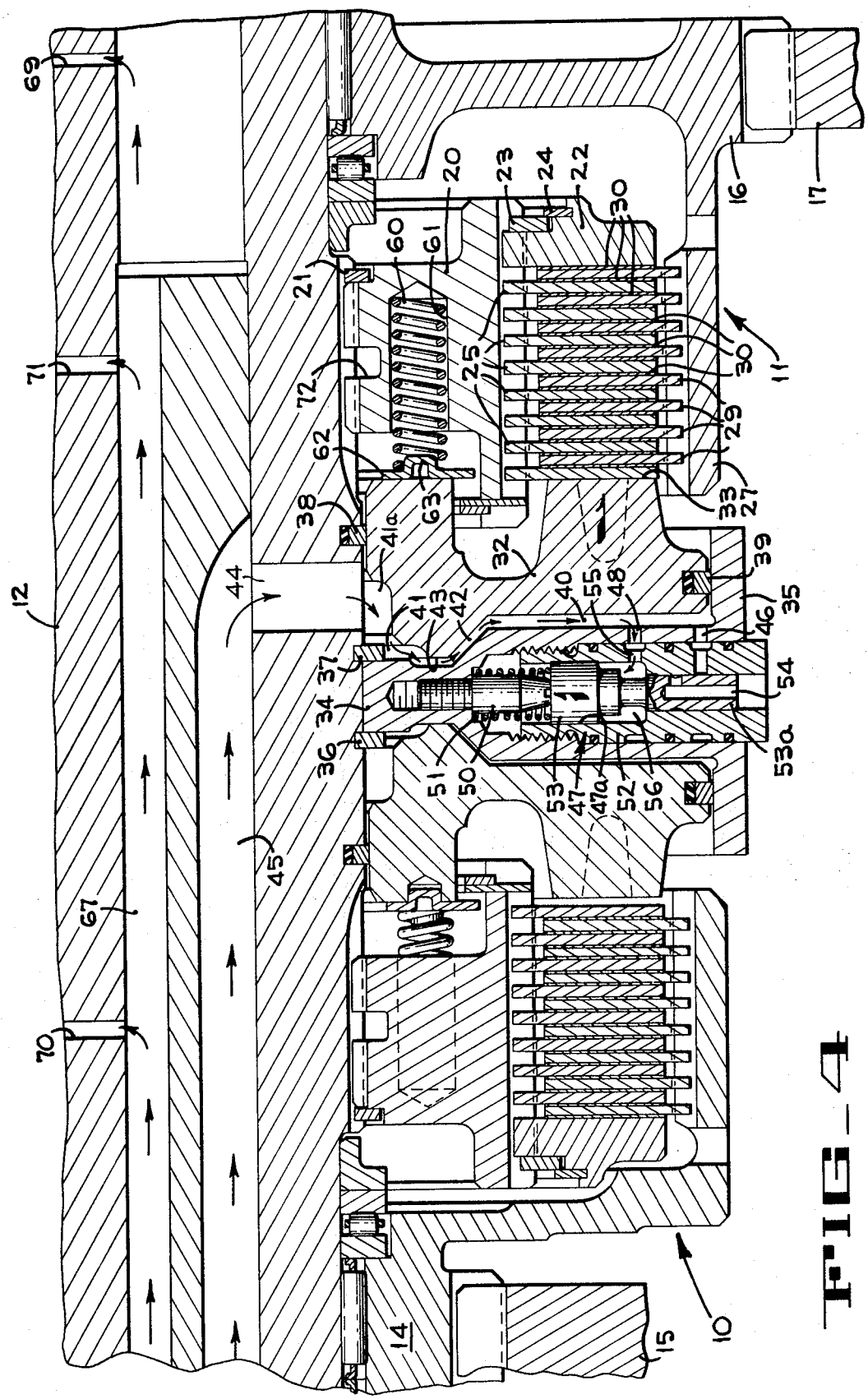
FIG. 4 is an enlarged sectional view of one of the dump valves and half-portions of the clutches shown in FIG. 1 but with one of the pistons being shown in its alternate clutch-engaging position.

With reference to the drawing, a pair of fluid operated friction clutches 10 and 11, shown in FIG. 1, are mounted on a shaft 12 driven by a drive element 13. Clutch 10 can be selectively engaged to drive a gear 14 in mesh with a driven gear 15, and clutch 11 can be engaged to drive a gear 16 in mesh with a driven gear 17. Both clutches have substantially the same structure with one being in reversed relationship to the other. Therefore, only clutch 11 will be described in detail, but it will be understood that the corresponding elements of clutch 10 are similar in structure. Each clutch operates independently of the other clutch, and, when only a single gear is to be driven, a single clutch on a shaft would be sufficient.

Clutch 11 includes a first rotatable assembly formed by a hub 20 splined for rotation with shaft 12 and retained against axial movement (to the right in FIG. 1) by a ring 21 recessed in the shaft. A backing plate 22 splined to the hub is held against axial movement in one direction by a ring 23 recessed in the hub and secured against axial movement in the other direction by a ring 24 recessed in the backing plate. A series of friction discs 25 are internally splined to the hub for rotation therewith but are capable of moving axially thereon.

A second rotatable assembly of clutch 11 is formed by a drum 27 projecting from gear 16. Externally splined to the interior of the drum to form a driving connection therewith are a series of friction discs 29 which are capable of moving axially with respect to the drum but are prevented from rotating relative thereto. Each face of each friction disc 29 has a layer of friction material 30 bonded thereto, and these friction discs are interleaved between friction discs 25 and backing plate 22. It will be appreciated that an axial force directed toward the drive element 13 can clamp the friction discs 25 and 29 in engagement with each other and the backing plate 22 to form a driving connection between the aforementioned rotatable assemblies which connection can be disengaged upon termination of the axial force.

An annular piston 32 has a surface 33 for contacting the adjacent friction disc 25 and compressing all friction discs 25 and 29 between it and backing plate 22. The piston is slidable within an annular cylinder defined by the shaft 12 and a barrier plate 34 having a cylindrical flange 35 projecting parallel with the shaft. The barrier plate is locked axially on the shaft by rings 36 and 37 and is keyed for rotation therewith.

Piston 32 is slidable axially about a suitable seal ring 38 seated within a groove in shaft 12. The piston carries, in a groove at the outermost radial surface thereof, a seal ring 39 which is axially slidable within the inner surface of cylindrical flange 35. A variable volume pressure chamber 40 is defined between the piston and the barrier plate 34, and this chamber can be divided into an inner cavity 41 adjacent to the shaft 12 and an outer cavity 42 when a projecting portion 43 of the piston is in sealing engagement with the barrier plate 34 as shown in FIG. 1.

An inlet 44 connects inner cavity 41 with a passage 45 in shaft 12 for introducing fluid into the cavity and selectively pressuring chamber 40. The inner cavity has a portion 41a of annular configuration located between the shaft and piston that extends axially of the piston for a length substantially greater than the length of piston travel within the annular cylinder. This inner cavity portion has a transverse radial dimension between the shaft and piston smaller than the axial length of the inner cavity portion. An outlet 46 located near the radially outermost portion of outer cavity 42 provides for the venting of fluid therefrom with the aid of centrifugal force when the chamber is not under pressure. Flow from the outlet is controlled by a dump valve 47 operating in response to fluid pressure within the chamber as sensed through a passage 48 between the chamber and dump valve.

Dump valve 47 fits within a radial bore 47a in barrier plate 34, and a similar dump valve 49 located opposite thereto provides for the venting of fluid from clutch 10. A valve seat 50 is threadably fitted into the barrier plate at the base of the radial bore, and a valve spring 51 fits around and extends above the valve seat. Threadably fitted into the bore above the valve seat is a cylindrical housing 52 that slidably mounts a spool 53 which is in engagement with the spring. Within the outwardly extending stem 53a of the spool is a passage 54 through which fluid can be vented from outlet 46 in the barrier plate when the spool is seated within the housing in its radially outermost position as shown in FIG. 1.

In communication with passage 48 in the barrier plate 34 is a port 55 in housing 52 which allows fluid to enter into an annular chamber 56 between the housing and spool 53, as shown in FIG. 4. When chamber 40 is pressured to engage clutch 11, fluid pressure builds up within annular chamber 56 forcing the spool to move radially inward in poppet valve fashion against spring 51 until it seats upon valve seat 50, as shown in FIG. 4. In this position of the spool, passage 54 does not communicate with outlet 46 in the barrier plate, and fluid is sealed within chamber 40 so that the clutch can be actuated. When fluid pressure within chamber 40 is reduced, centrifugal force acting upon spool 53 and the resilient force of spring 51 tend to force the spool radially outward until passage 54 is placed in communication with outlet 46 in the barrier plate, and fluid can be vented from the chamber.

Compression springs 60 are seated within bores 61 spaced about the annular face of hub 20 adjacent piston 32 for applying a return force to the piston. These springs have a combined strength greater than the force developed by fluid retained within inner cavity 41 when subjected to maximum centrifugal force by rotating shaft 12 at the highest design speed. Thus, it will be apparent that the springs will hold piston portion 43 in sealing contact with barrier plate 34 (as shown in FIG. 1) unless fluid in passage 45 is pressured to engage the clutch and move the piston axially.

Interposed between springs 60 and piston 32 is a retainer ring 62, shown more clearly in FIG. 2. Projections 63 extend from the ring into the springs, while opposite projections 64 extend from the ring into openings 65 (FIG. 1) within the piston. Consequently, the piston is locked for rotation with hub 20, shaft 12 and barrier plate 34 to prevent wear of the seal rings 38 and 39 due to relative rotational movement therebetween.

Oil is supplied in shaft 12 through a longitudinal passage 67 to radial passages 68 and 69 for lubricating bearings supporting gears 14 and 16. Clutches 10 and 11 are lubricated by oil flowing from passage 67 through radial passages 70 and 71. With reference to FIG. 3, an annular passage 72 in hub 20 circulates oil from passage 71 to a plurality of chambers 73, and oil flows radially outward therefrom through ports 74 and 75 (FIG. 1) to lubricate the spline connections and friction discs 25 and 29.

As shown in FIG. 2, a passage 76 is provided in shaft 12 to carry fluid to an inlet 77 for actuating clutch 10. This clutch is vented by a dump valve 49, shown in FIG. 1, which is similar to dump valve 47 that vents clutch 11 whereby no further detailed description of this dump valve is believed to be necessary.

In operation, clutch 10 can be engaged by pressuring fluid in passage 76, while clutch 11 is engaged by pressuring fluid in passage 45. It will be understood that the operation of clutch 10 is similar to the operation of clutch 11 which latter operation will now be described. Pressure of the incoming fluid builds up in inner cavity 41 of the chamber 40 until the strength of compression springs 60 is overcome and piston 32 moves away from barrier plate 34 allowing fluid to flow past piston portion 43 into outer cavity 42 of the chamber 40. As the outer cavity is filling with fluid, higher pressure is maintained in the inner cavity due to the restricted orifice between piston portion 43 and the adjacent face of the barrier plate 34 thereby causing the piston to continue to move towards engagement with friction disc 25 until the spacing between the piston portion and barrier plate no longer restricts the flow between cavities.

While piston portion 43 is moving away from barrier plate 34, fluid pressure builds up in outer cavity 42 and dump valve 47 is closed by fluid pressure therefrom passing through passage 48 and port 55 into annular chamber 56. Pressure in chamber 56 forces spool 53 to move radially inward to valve seat 50 thereby blocking communication between outlet 46 and passage 54. After the dump valve is closed, pressure rapidly builds up within chamber 40 forcing piston 32 to compress friction discs 25 and 29 together between the piston and backing plate 22, as shown in FIG. 4. Upon engagement of the friction discs, drum 27 and gear 16 rotate with shaft 12 to drive gear 17.

Clutch 11 is disengaged by reducing fluid pressure in passage 45, chamber 40 and annular chamber 56, allowing spool 53 to move radially outward due to centrifugal force and resilient force of spring 51 until passage 54 vents outlet 46. Fluid in outer cavity 42 is then forced outward by centrifugal force and drains through the opened outlet and passage 54 of the dump valve. Springs 60 urge piston 32 towards a position where portion 43 thereof sealingly engages barrier plate 34 and friction discs 25 are separated from friction discs 29.

All the fluid is allowed to drain from outer cavity 42 to prevent a pressure build-up therein due to centrifugal force, but fluid is retained within inner cavity 41 and passage 45 for providing for rapid engagement of the clutch when desired.

Although the best mode contemplated for carrying out the present invention has been herein shown and described, it will be apparent that modification and variation may be made without departing from what is regarded to be the subject matter of the invention.

What is claimed is:

1. A fluid operated friction clutch comprising a first rotatable assembly; a second rotatable assembly; interleaved friction discs connected to said assemblies and forming a disengageable driving connection therebetween; means defining an annular cylinder rotatable with one of said rotatable assemblies; an annular piston slidable in said cylinder and therewith defining a variable volume pressure chamber; said piston having a surface engageable with one of said discs when fluid within said chamber is pressurized causing engagement of said discs and consequent driving connection between said assemblies; said piston having a portion engageable with said cylinder defining means to divide the pressure chamber into an inner cavity and an outer cavity; said inner cavity having a fluid inlet in direct communication with a sole fluid supply passage for pressurizing said pressure chamber so that all of the fluid for pressurizing said pressure chamber flows into said inner cavity; said outer cavity being in communication with a fluid outlet for relieving fluid pressure within said chamber; resilient means having a strength greater than the force developed by fluid retained within the inner cavity when subjected to maximum centrifugal force for urging said piston portion into engagement with said cylinder defining means and thereby preventing bleeding of fluid from the inner cavity unless fluid within the inner cavity is pressurized for engaging the clutch, and a dump valve in communication with said fluid outlet for blocking the flow of fluid from said outlet in response to a predetermined fluid pressure within the outer cavity, said dump valve having a housing threadable fitted into a radial bore within said cylinder defining means at a location spaced axially from the pressure chamber defined thereby, a stem slidably fitted within said housing and defining therewith a passage from said fluid outlet when the stem is in a radially outermost position, a spool connected to the innermost end of the stem, said housing defining an annular chamber about said stem at a position radially outward from the spool and a port providing communication between the annular chamber and the outer cavity, said spool and stem being movable radially inward in response to a predetermined fluid pressure in said annular chamber and outer cavity, and a compression spring fitting within said housing and cylinder defining means to urge said spool and stem radially outward against the fluid pressure in said annular chamber.

2. A fluid operated friction clutch comprising a first rotatable assembly; a second rotatable assembly; interleaved friction discs connected to said assemblies and forming a disengageable driving connection therebetween; means defining an annular cylinder rotatable with one of said rotatable assemblies; an annular piston slidable in said cylinder and therewith defining a variable volume pressure chamber; said piston having a surface engageable with one of said discs when fluid within said chamber is pressurized causing engagement of said discs and consequent driving connection between said assemblies; said piston having a portion engageable with said cylinder defining means to divide the pressure chamber into an inner cavity and an outer cavity when fluid within said chamber is not pressurized and to act as a valve limiting all fluid flow from the inner cavity to the outer cavity; said inner cavity having a fluid inlet in direct communication with a sole fluid supply passage through which all fluid for pressurizing said pressure chamber flows into said inner cavity; said outer cavity being in communication with a fluid outlet for relieving fluid pressure within said chamber; and resilient means in continuous operative engagement with said piston and having a strength greater than the force developed by fluid retained within the inner cavity when subjected to maximum centrifugal force for urging said piston portion into engagement with said cylinder defining means and thereby preventing bleeding of fluid from the inner cavity unless fluid within the inner cavity is pressurized for engaging the clutch; said inner cavity having a portion of annular configuration located between the shaft and piston and extends axially of the piston for a length substantially greater than the length of piston travel within the annular cylinder and has a transverse radial dimension between the shaft and piston smaller than said axial length of the portion; whereby fluid pressure for driving the piston towards engagement with one of said discs can be maintained within the inner cavity portion while the outer cavity is being pressurized by a flow of fluid from the inner cavity but wherein the fluid pressure acting against the piston due to centrifugal force on fluid retained in the inner cavity portion before pressurization for engaging the clutch is minimized.

3. A clutch as described in claim 2 including a retainer positioned between said resilient means and piston, said retainer having projections thereon that extend into openings within said piston and projections that extend into openings within said resilient means, forming a connection therebetween to prevent relative rotational movement between said piston and said cylinder defining means.

* * * * *